Aug. 24, 1948.   L. H. BAGHUIS   2,447,679
SPRING SUSPENSION FOR MOTORBUSES
OR LIKE VEHICLES

Filed Oct. 29, 1945   2 Sheets-Sheet 1

Inventor
L. H. Baghuis

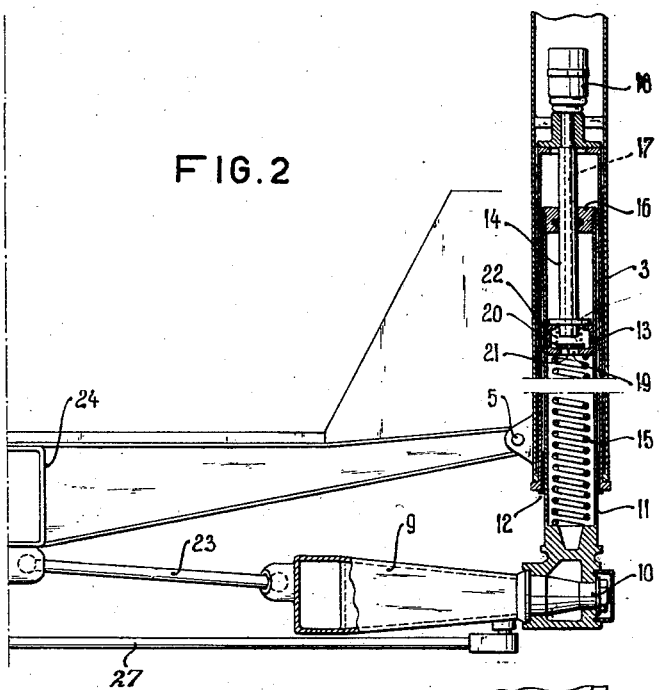
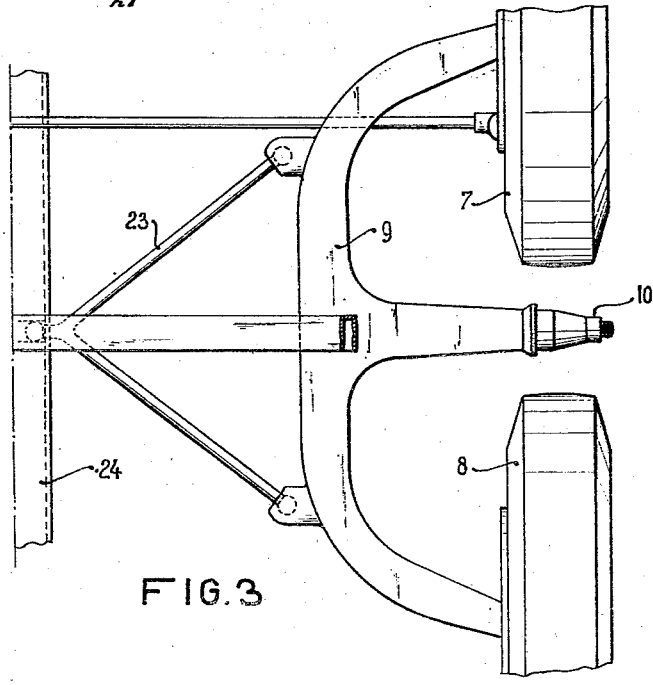

Patented Aug. 24, 1948

2,447,679

UNITED STATES PATENT OFFICE 2,447,679

SPRING SUSPENSION FOR MOTORBUSES OR LIKE VEHICLES

Ludovicus Hendrikus Baghuis, Utrecht, Netherlands

Application October 29, 1945, Serial No. 625,129
In the Netherlands March 31, 1942

Section 1, Public Law 690, August 8, 1946
Patent expires March 31, 1962

1 Claim. (Cl. 280—124)

The invention relates to a motorbus or like vehicle and has particularly in view to simplify the construction of such a vehicle for road traffic and to improve the spring suspension thereof. It consists mainly in this, that the car body is formed as a self supporting box, from which the wheels or sets of wheels are directly and individually suspended by springs. This direct suspension of the wheels from the car body, whereby the usual chassis or underframe is rendered superfluous, not only means a considerable simplification, but also permits of the springs being arranged within, or next to, the planes of the side-walls. This allows of the spring suspension means being amply dimensioned so as to ensure increased safety, and of using long volute springs rendering the springing very weak, without, however, creating the danger of bumping. It is also easy to provide the spring suspension means with a shock reducer and to considerably increase the stability of the vehicle by mounting the springs in the places of greatest width of the vehicle.

According to the invention, the spring suspension means are preferably mounted within the side walls, for instance, within the frame posts of the car body.

Vertical helical springs can advantageously be used for the spring suspension. These helical springs may each be placed within a cylinder filled with liquid and whose piston is provided with a valve having a throttling vent. The piston is attached to the car body and the cylinder to a yoke supporting the axle journals for the wheels, or vice versa.

Since the springs can extend up to the roof of the car body, it is easily possible to arrange the points of suspension of the car body at a level above the centre of gravity thereof, so that during driving through bends of the road the car body will not lean over to the outside, but to the inside of the bend.

To elucidate these and other features of the invention, reference is had to the drawing, which shows, by way of example, an embodiment of the invention. In the drawing:

Fig. 2 is a sectional elevation, on an enlarged scale, of the spring suspension device of the vehicle according to Fig. 1.

Fig. 3 is a plan view of a detail of the device according to Fig. 2, and

Figure 1:
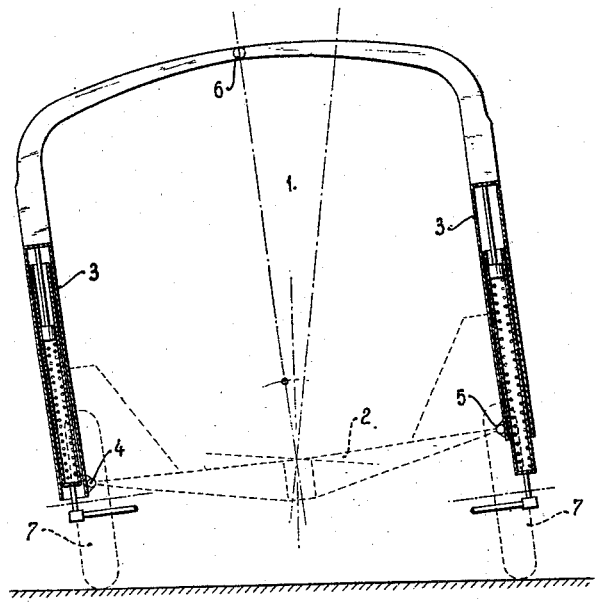
Fig. 1 is a cross section in diagram of a vehicle according to the invention.

1 designates a self-supporting, box-shaped car body of a motorbus and constructed as a triangular frame work. Said body comprises a bottom 2 and side walls 3. The frame posts of the side walls are bent towards each other at their top ends to support the roof. At 4, 5 and 6 they are hinged to the bottom 2 and to each other, respectively. The side walls of the motorbus are of double construction. In the space between the walls of each side wall the suspension springs are mounted.

The wheels 7, 8 of each set are rotatably and, if necessary, steerably attached to a yoke 9. In case the wheels 7 are mounted for steering movement they are connected with a suitable steering mechanism (not shown) by a rod 27. The latter is provided with a horizontal axle journal 10 supporting a vertical cylindrical tube 11. Consequently, the yoke is adapted to rock about a horizontal axis. The tube 11 is slidable in a guideway 12 of the frame posts. Movable within the cylinder 11 is a piston 13, which is rigidly connected to the frame post by means of a rod 14. Moreover, a compression spring 15 supporting the car body is mounted within the tube 11 so as to bear against the bottom face of the piston.

The cylinder 11 is totally filled with liquid, e. g. oil, and is closed at its top end by a stuffing box 16. The piston rod 14 has an axial passage 17 opening into an expansion chamber 18 permitting the liquid to escape during the inward movement of the piston rod 14 in the cylinder. The piston is provided with an aperture 19, which is nearly completely closed by a valve 20 having a vent 21. Valve 20 is urged onto its seat by a spring 22.

When the wheels 7, 8 are pushed upwardly by an obstacle on the road, spring 15 is compressed by the upward movement of the cylinder 11. The liquid contained within the space below piston 13 opens valve 20 against the force of spring 22, so that it can escape almost without resistance. The damping action is then very slight. During the return movement of cylinder 11, however, valve 20 is closed, and the liquid can flow into the space below the piston through vent 21 only. Thus, spring 15 releases slowly, which is of great importance for suitably damping the spring action.

In order to prevent the yoke 9 from turning about the axis of cylinder 11, said yoke is connected to the central beam 24 of the car body floor by a fork 23. The connections between fork 23, beam 24 and yoke 9 are constituted as hinges, so as to permit free up and down movement of the yoke.

Figure 4:
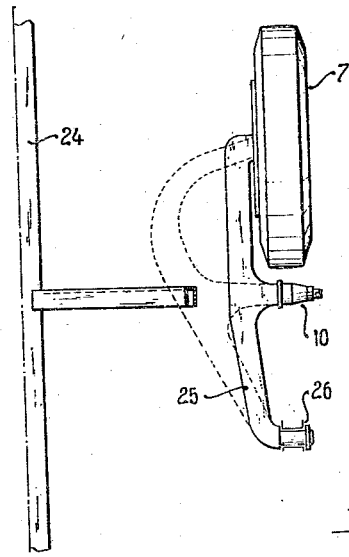
Fig. 4 is a plan view of a detail of a second embodiment of the invention.

According to Fig. 4, yoke 25 is designed to support only one wheel 7, which if necessary is steerable. The end of said yoke, at which no wheel is provided, is hinged to the car body as at 26.

What I claim is:

A motorbus comprising in combination a self-supporting car body having double-walled sides, wheels, yokes, horizontal journals on said yokes, springs, guides fixed to said car body between the walls of the sides thereof, a tube slidably mounted in each of said guides and connected to the car body through at least one of said springs, each of said yokes being hinged by one of said journals to one of said tubes and rotatably supporting at least one of said wheels, and said car body being carried by said springs at points situated at a level above the centre of gravity of the car body.

LUDOVICUS HENDRIKUS BAGHUIS.

REFERENCES CITED

The following references are of record in the file of this patent:

UNITED STATES PATENTS

| Number | Name | Date |
|---|---|---|
| 144,473 | Nichols | Nov. 11, 1873 |
| 737,852 | Lohsand | Sept. 1, 1903 |
| 1,404,575 | Brown | Jan. 24, 1922 |
| 1,711,881 | Fornaca | May 7, 1929 |
| 2,011,565 | Barnes | Aug. 20, 1935 |
| 2,103,381 | Perkins et al. | Dec. 28, 1937 |
| 2,115,864 | Livermon | May 3, 1938 |